United States Patent [19]

Maag

[11] Patent Number: 5,040,106

[45] Date of Patent: Aug. 13, 1991

[54] APPARATUS FOR DRAWING A PRE-SELECTABLE QUANTITY OF LIQUID

[75] Inventor: Horst Maag, Schönaich, Fed. Rep. of Germany

[73] Assignee: Hansa Metallwerke AG, Stuttgart, Fed. Rep. of Germany

[21] Appl. No.: 400,139

[22] Filed: Aug. 29, 1989

[30] Foreign Application Priority Data

Sep. 2, 1988 [DE] Fed. Rep. of Germany ....... 3829831

[51] Int. Cl.[5] .......................... B67D 1/14; G05B 11/18

[52] U.S. Cl. .............................. 364/167.01; 364/510; 222/639; 222/641; 222/56; 141/192

[58] Field of Search .......................... 364/510, 167.01; 141/192, 195, 196; 251/205; 222/56, 639, 640, 641

[56] References Cited

U.S. PATENT DOCUMENTS

| | | | |
|---|---|---|---|
| 2,066,169 | 12/1936 | Zwosta | 141/196 |
| 4,569,012 | 2/1986 | Sekozawa et al. | 364/510 |
| 4,597,048 | 6/1986 | Mazur et al. | 364/510 |
| 4,682,728 | 7/1987 | Oudenhoven et al. | 364/510 |
| 4,715,786 | 12/1987 | Wolff et al. | 364/510 |
| 4,736,875 | 4/1988 | King | 222/641 |
| 4,931,938 | 6/1990 | Hass | 364/510 |

*Primary Examiner*—Jerry Smith
*Assistant Examiner*—Patrick Muir
*Attorney, Agent, or Firm*—Fred Philpitt

[57] ABSTRACT

An apparatus for drawing a pre-selectable quantity of liquid, in particular a quantity of water, comprises an input device, at which the respectively desired quantity of liquid to be delivered automatically can be fed in. Located in the path of the liquid is an electrically variable flow-control valve, whereof the position is varied automatically according to the pre-selected quantity of liquid, corresponding to a characteristic curve stored in a memory: the flow rate is chosen to be all the greater, the greater the pre-selected quantity of liquid. Due to this it is ensured that very different quantities of liquid can be drawn in times which are practical for use.

14 Claims, 2 Drawing Sheets

APPARATUS FOR DRAWING A PRE-SELECTABLE QUANTITY OF LIQUID

The invention relates to an apparatus for drawing a pre-selectable quantity of liquid, in particular a quantity of water, with an input device, in which the quantity of liquid can be adjusted and with an electrically operated shut-off valve.

In large kitchens, there is increasingly a requirement for electronically controlled fittings delivering water. In large kitchens, the personnel have the task of filling containers of different size with a varying storage capacity, to a greater or lesser extent. In this case, generally the number of liters of water which is required for a certain dish is specified. In large kitchens, where frequently dishes are prepared for several hundred people, this number of liters is relatively large. Although, it happens that for individual dishes, a relatively small quantity of, for example one liter, water must be drawn. Now if a valve with a large flow rate, as is necessary for the delivery of the large quantities of water normally required, is opened for the delivery of such a small quantity, then it is very difficult to control the correct metering. The opening times of the valve would be extraordinarily short and the inaccuracies which are caused by the switching operation, would be clearly noticeable. Furthermore, small vessels could be destroyed by the powerful water jet which arrives suddenly.

It is the object of the present invention to provide an apparatus of the aforementioned type, with which both large as well as small quantities of liquid can be drawn precisely and without problems.

This object is achieved according to the invention by the fact that the apparatus also comprises:

a) an electrically adjustable volume-control valve, by which the flow rate is continuously variable between a minimum value and a maximum value;

b) a memory, in which a characteristic curve is memorized, which produces a relationship between the quantity of liquid and the flow rate in such a way that as the quantity of liquid increases, the flow rate increases;

c) a control unit, which according to the quantity of liquid pre-selected at the input device reads the associated flow rate from the memory and adjusts the flow-control valve by corresponding electrical signals.

Thus, in the apparatus according to the invention, one does not always work with the same flow rate, which would lead to the above-mentioned difficulties when drawing off small quantities of liquid. Instead of this, the flow rate increases progressively with the selected quantity of liquid, so that the full flow rate of the shut-off valve is thus reached solely with the greatest pre-selected quantities of liquid. With smaller quantities of liquid, the flow rate is restricted according to the characteristic curve stored in the memory so that reasonable, acceptable and easily controlled drawing times are obtained. In the simplest case, the characteristic curve may be linear, so that irrespective of the quantity of liquid chosen, the same drawing time is always achieved. However, basically many kinds of characteristic curve are conceivable, which can be adapted to the respective wishes.

The flow-control valve does not need to be an independent appliance.

In an advantageous embodiment of the invention, the flow-control valve is a variable stroke-limiting device integrated in the shut-off valve. In other words: the shut-off valve is opened to a varying extent according to the pre-selected quantity of liquid; only when the maximum quantity of liquid is to be delivered does the shut-off member of the shut-off valve carry out its full opening stroke.

Appropriately a locking circuit is provided, which monitors the time during which the flow-control valve is adjusted and allows the switching of the shut-off valve solely after the expiration of this time. This locking circuit takes into consideration the fact that the adjusting operation of the flow-control valve requires a certain time and prevents water from beginning to flow before the desired position of the flow-control valve is reached. On the other hand, the aforementioned, undesirable drawbacks could nevertheless occur in the first stage of opening of the shut-off valve.

If particular accuracy is desired in the quantity of liquid delivered, a flow meter is recommended, which monitors the quantity of liquid flowing after the shutoff valve is opened and closes the shut-off valve on reaching the pre-selected quantity of liquid. This embodiment is substantially independent of the pressures respectively prevailing in the liquid system.

If such high requirements are not made of the accuracy of the quantity of water delivered, and in addition the pressure in the liquid system is to some extent constant, then in place of the flow meter, an electrical timing member is sufficient, which produces an opening pulse for the shut-off valve with a time duration which corresponds to the pre-selected quantity of liquid. One then simply proceeds from the fact that during certain opening durations of the shut-off valve, in certain positions of the flow-control valve, certain quantities of liquid flow.

The memory can be programmed by way of the input device. In this way, different characteristic curves can be pre-set, according to which the entire apparatus should operate.

Embodiments of the invention are described in detail hereafter with reference to the drawings, in which.

Figure 1:
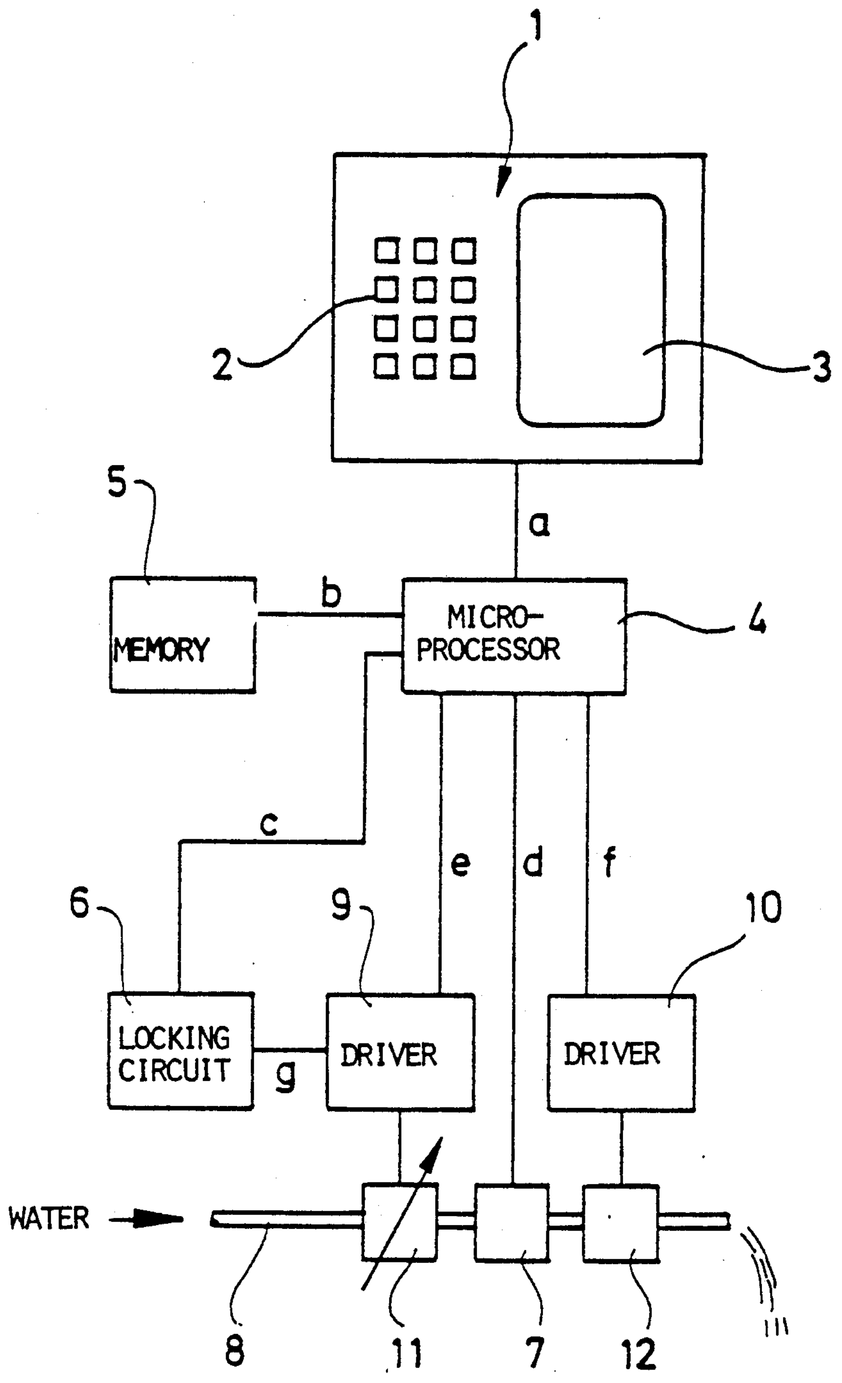
FIG. 1 shows diagrammatically the block circuit diagram of an apparatus for drawing a pre-selectable quantity of water.

The apparatus for drawing a pre-selectable quantity of water comprises an input panel 1 with a keyboard 2 as well as a visual display 3. The input panel 1 is connected by way of a lead a to a microprocessor 4. The microprocessor 4 may be in data exchange with a programmable memory 5 by way of a lead b. It also receives input signals by way of a lead c from a locking circuit 6 and a lead d from a flow meter 7, which is located in the water line 8.

Depending on the various signals, which are supplied to the microprocessor 4 by way of the leads a b, c and d, the latter controls two driver circuits 9, 10 by way of the leads e and f. The first driver circuit 9, which supplies signals to the locking circuit 6 by way of a lead g, supplies current to a volume-control valve 11, which is likewise located in the water line 8. The second driver circuit 10 supplies the electrical energy for the control member of a shut-off valve 12, which downstream of the volume-control valve 11 and the flow meter 7, in series with the latter, releases or shuts off the flow of water from the water line 8.

Figure 2:
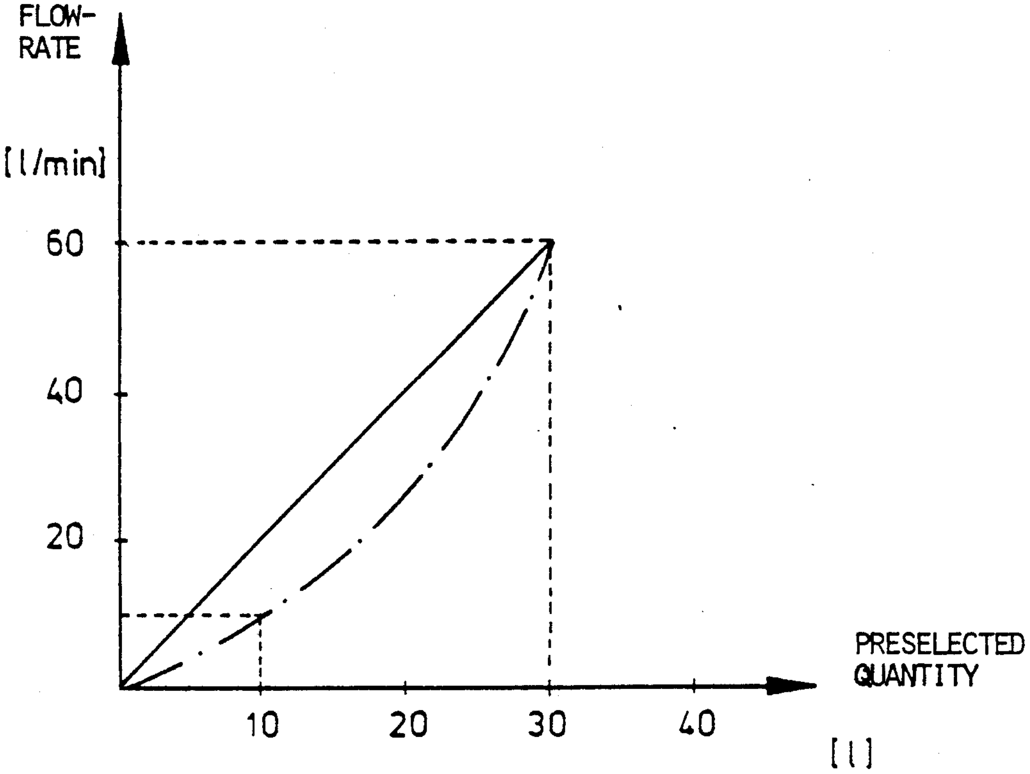
FIG. 2 shows various possible characteristic curves, according to which the apparatus of FIG. 1 can be operated.

The afore-described apparatus operates as follows:

A certain characteristic curve is stored in the memory 5, according to which the apparatus should operate. This characteristic curve represents a certain relationship between the respectively selected quantity of water and the position of the flow-control valve 11. Examples of such characteristic curves are illustrated in FIG. 2. This will be discussed in more detail hereafter.

Now if a certain quantity of water to be drawn is keyed-in on the input panel 1 by means of the keyboard 2, then the microprocessor 4 calls up the associated position flow rate of the flow-control valve 11 by way of the lead b from the memory 5. By way of the lead e, the microprocessor 4 sends a signal to the driver 9, which supplies current to the flow-control valve 11 until the flow-control position read from the memory 5 is reached. The locking circuit 6 in this case monitors the time during which the flow-control valve 11 is adjusted. In the present example, this takes place electrically due to the connection to the driver circuit 9, but could naturally also take place mechanically by way of a corresponding sensor, which is disposed directly at the flow-control valve 11. If the locking circuit 6 ascertains that the flow-control valve 11 has reached its desired position, it sends a corresponding signal by way of the lead c to the microprocessor 4. The latter now opens the shut-off valve 12 by a signal on the lead f, which leads to a corresponding operation of the driver circuit 10. Water begins to flow from the pipe 8.

The quantity of flowing water is monitored by the flow meter 7. If the quantity of water determined at the input panel 1 is reached, the microprocessor 4 terminates its output signal on the lead f, whereupon the driver 10 discontinues the supply of current to the shut-off valve 12 and the latter returns to its closed position under the action of a spring. Naturally, this arrangement may also be such that the shut-off valve 12 is moved both into the open position as well as into the closed position by corresponding supply of current, whereas in the open and closed positions themselves, it remains dead.

Now if a smaller quantity of water is pre-selected at the input panel 1 when the apparatus is next used, this smaller quantity of water is associated with a smaller flow rate of the flow-control valve 11 from the memory 5; moreover, the operations are exactly as already described above. The result is that the time during which the device delivers water, in the case of small flow rate, is not proportionally less than in the case of large flow rates due to which sensitive drawing of water is possible in particular in the case of small quantities.

The exact way in which the flow rate of the flow-control valve 11 depends on the pre-selectable quantity, is determined, as mentioned above, by the characteristic curve stored in the memory 5.

In FIG. 2, a first characteristic curve is drawn in full line, the latter producing an exactly linear relationship between the pre-selected quantity of water and the flow rate of the flow-control valve. Thus, for example, for the pre-selected quantity of 30 liters, a flow rate of the flow-control valve of 60 liters per minute is predetermined. This means that the pre-selected quantity is delivered in half a minute. Due to the linearity of the characteristic curve, the drawing time for all the pre-selected quantities of water remains the same. Even with a pre-selected quantity of 10 liters, the drawing time amounts to half a minute, since a flow rate of the flow-control valve of 20 liters, per minute is associated with the pre-selected quantity of 10 liters.

In FIG. 2, a second characteristic curve is shown in dot-dash line, which deviates from linearity. It is similar to a parabolic arc, which remains entirely below the linear characteristic curve drawn in full line. This has the result that the drawing times now no longer remain constant independently of the pre-selected quantity. Whereas with a pre-selected quantity of 30 liters, the drawing time as before amounts to half a minute, a drawing time of a full- minute is associated with a pre-selected quantity of 10 liters. In this way, the filling of containers with small, pre-selected quantities of water can take place in a particularly sensitive manner.

However, it is common to all conceivable characteristic curves that the flow rate of the flow-control valve increases monotonically with the pre-selected quantity.

In a particular type of operation, the characteristic curve, according to which the apparatus will operate, can be programmed into the memory 5 by way of the input panel 1.

In a further embodiment, which is not illustrated in the drawings, the flow meter 7 in the water pipe 8 is dispensed with. Instead of this, the quantity of water pre-selected at the input panel 1 is converted in the microprocessor 4 into a certain opening time of the shut-off valve 12. However, this method is less accurate and is only suitable where the pressure in the water pipe 8 is relatively constant.

The above description is based on the fact that the flow-control valve 11 and the shut-off valve 12 are separate, independent units. However, they could both be combined functionally. In a preferred embodiment this takes place due to the fact that the opening stroke of the closure member of the shut-off valve is limited in a variable manner. The valve closure member thus does not always travel into the same, full open position, but also into intermediate positions, in which it restricts the flow of water appropriately. The extent of opening of the shut-off valve is in this case determined to correspond to the characteristic curve for each pre-selected quantity of water to be drawn, stored in the memory 5.

I claim:

1. Apparatus for drawing a pre-selected quantity of liquid with an input device in which the quantity of liquid is presettable and with an electrically operated shut-off valve (12) further comprising:
   - (a) an electrically adjustable flow-control valve (11), by which the flow rate delivered is continuously variable between a minimum value and a maximum value;
   - (b) a memory (5) in which a characteristic curve is memorized and which establishes a relationship between the quantity of liquid and the flow rate in such a way that as the quantity of liquid increases, the flow rate increases; and
   - (c) a control unit (4) which, according to the quantity of liquid pre-selected at the input device (1), reads the associated flow rate from the memory (5) and adjusts the flow-control valve (11) by corresponding electrical signals.

2. Apparatus according to claim 1 wherein the flow-control valve (11) is formed by a variable stroke-limiting device integrated in the shut-off valve (12).

3. Apparatus according to claim 2 which further comprises a locking circuit (6) which monitors the time during which the flow-control valve (11) is adjusted and allows the switching of the shut-off valve (12) solely after the expiration of this time.

4. Apparatus according to claim 3 which further comprises a flow meter (7) which monitors the quantity of liquid flowing after opening the shut-off valve (12) and closes the shut-off valve 912) on reaching the pre-selected quantity of liquid.

5. Apparatus according to claim 4 which further comprises an electric timing member which produces an opening pulse for the shut--off valve (12) with a time duration which corresponds to the pre-selected quantity of liquid.

6. Apparatus according to claim 4 wherein the memory (5) is programmable by way of the input device (1).

7. Apparatus according to claim 3 which further comprises an electric timing member which produces an opening pulse for the shut-off valve (12) with a time duration which corresponds to the pre-selected quantity of liquid.

8. Apparatus according to claim 3 wherein the memory (5) is programmable by way of the input device (1).

9. Apparatus according to claim 2 which further comprises a flow member (7) which monitors the quantity of liquid flowing after opening the shut-off valve (12) and closes the shut-off valve (12) on reaching the pre-selected quantity of liquid.

10. Apparatus according to claim 22 wherein the memory (5) is programmable by way of the input device (1).

11. Apparatus according to claim 1 which further comprises a locking circuit (6) which monitors the time during which the flow-control valve (11) is adjusted and allows the switching of the shut-off valve (12) solely after the expiration of this time.

12. Apparatus according to claim 1 which further comprises a flow meter (7) which monitors the quantity of liquid flowing after opening the shut-off valve (12) and closes the shut-off valve (12)) on reaching the pre-selected quantity of liquid.

13. Apparatus according to claim 1 which further comprises an electric timing member which produces an opening pulse for the shut-off valve (12) with a time duration which corresponds to the pre-selected quantity of liquid.

14. Apparatus according to claim 1 wherein the memory (5) is programmable by way of the input device.

* * * * *